2,901,504
NITRILES FROM AROMATIC ACIDS AND DERIVATIVES

Robert S. Aries, New York, N.Y.

No Drawing. Application September 6, 1956
Serial No. 608,204

11 Claims. (Cl. 260—465)

The present invention relates to the conversion of aromatic acids and their derivatives to the corresponding nitriles. More particularly, it relates to the direct conversion of normally solid aromatic carboxylic acids and their derivatives to the corresponding nitriles.

Aromatic acids, anhydrides, amides, imides and other derivatives can be converted to the corresponding nitriles by reaction with ammonia in the vapor phase over a dehydrating catalyst, according to the following reactions:

$$RCOOH + NH_3 \rightarrow RCN + 2H_2O$$
$$R(COOH)_2 + 2NH_3 \rightarrow R(CN)_2 + 4H_2O$$

wherein R is an organic residue.

Where the starting material is normally solid, it has conventionally been melted prior to being fed into a vaporization zone. It has been found, however, that these materials often melt with decomposition and acids, in particular, undergo decarboxylation with formation of tars and colored bodies. In the case of benzoic acid, benzene has been isolated from the melt and nicotinic acid melts are characterized by the odor of pyridine.

High melting aromatic acids such as isophthalic acid and terephthalic acid can be melted only with great difficulty since heat transfer to the solid is slow. It is necessary that the pot temperature be higher than the melting point of the starting material in order to effect liquefaction, and where it is desired to speed up the heat transfer, even larger temperature gradients are utilized. This gives rise to decomposition which is aggravated by local overheating due to the inefficient heat transfer.

It is accordingly an object of the present invention to provide a process for the conversion of normally solid aromatic acids and their derivatives to their nitriles without decomposition.

In accordance with the present invention the solid starting material is intimately mixed with the catalyst and contacted with ammonia at elevated temperature so that melting of the acid material is immediately followed by vaporization and reaction with the ammonia. In this manner the acid is not maintained at elevated temperature for any prolonged period, and no opportunity is afforded for decomposition to occur.

Starting materials suitable for use in accordance with the present invention include mono- and polycarboxylic aromatic acids as well as their anhydrides, amides and imides, such as benzoic acid, the various phthalic acids, nicotinic acid, isocinchomeronic acid, orthophthalic acid anhydride, phthalimide, and the like. Conventional dehydrating catalysts can be employed, such as alumina, silica, aluminum phosphate, thoria, mixtures thereof, and the like. The temperature will depend upon the physical properties of the material undergoing conversion.

The process can be effected in several different ways. In one system, an intimate mixture of catalyst and solid feed material is fed in at the top of a tube which is provided at its bottom with means, such as a star valve, to control the downward flow of solid. Preheated ammonia gas is introduced at any convenient point in the column and a section of the tube is heated. The solid feed material vaporizes at the heated section and immediately reacts with the ammonia under the influence of the catalyst, vapor being discharged immediately following the reaction zone. While the flow of catalyst and ammonia can be countercurrent, concurrent flow is preferred.

A second suitable system consists of a tube reactor wherein a powdered mixture of catalyst and solid reactant is fluidized in a stream of ammonia and the stream is passed through a heated tube so that vaporization and conversion take place. Cyclone separation can be used to separate the gaseous stream from the solid catalyst, which latter can then be re-used.

A variation of this system involves fluidizing only powdered solid reactant in a stream of ammonia followed by preheating to a desired temperature and introduction into a fluidized bed of powdered catalyst maintained at elevated temperature where conversion takes place.

The ammonia is preferably employed in excess of the theoretical amount and where it is used as the fluidizing medium it is convenient to employ as much as 10 or more times the theoretical quantity since the unused ammonia can be recovered and re-used.

The following examples illustrate process in accordance with the present invention:

Example I (a) The equipment comprises a 5 ft. stainless steel tube 1½ inches in diameter provided with a vibrator to prevent bridging of the solid. A star valve is provided at the bottom of the tube and upon rotation continuously removes catalyst from the tube at a rate equal to that at which it is introduced into the top of the tube. The top portion of the tube is heated to 250° C. and constitute a preheating zone. The intermediate portion of the tube is heated to a temperature of 475° C. so as to constitute a reaction zone, gaseous ammonia being introduced at the top of this zone and gaseous products being withdrawn at the bottom of the zone. The bottom portion is flushed with gas to prevent leakage of ammonia.

(b) A physical mixture of equal weights of powdered benzoic acid and ⅛ inch cylinders of alumina is fed into the top of the tube at the rate of 200 grams per hour. Ammonia is also introduced at the top of the tube at the rate of 75 liters per hour STP and the star valve is operated to withdraw 100 grams of catalyst per hour. Benzonitrile is obtained in a yield of 96% based on benzoic acid.

Example II

The process of Example I is repeated, using nicotinic acid in place of benzoic acid. A 95% yield of nicotinonitrile is obtained based on the nicotinic acid.

Example III

By way of comparison, a melt of nicotinic acid is maintained at 250° C. and ammonia is bubbled therethrough. The gaseous mixture of ammonia and nicotinic acid is conducted over an alumina catalyst at the same rate as in Example II. A 45% yield of nicotinonitrile is obtained together with copious amounts of pyridine.

Example IV

The process of Example I is repeated, using as the feed material a mixture of equal parts by weight of isophthalic acid and silica gel. There is obtained an 89% yield of isophthalodinitrile.

Example V

The process of Example I is repeated with a feed material comprising equal weights of terephthalic acid and a silica-alumina cracking catalyst analyzing 85% by weight SiO$_2$. A 92% yield of terephthalonitrile is obtained.

Example VI

The process of Example I is repeated with a feed material comprising equal weights of phthalimide and ⅛ inch alumina pellets. Ortho-phthalodinitrile is obtained in about a 90% yield.

Example VII (a) The equipment comprises a coiled tubular reactor having 5 turns of 1 foot diameter, the diameter of the tube being ½ inch. A solids hopper communicates with the tube a few inches from its mouth.

(b) A powdered mixture of phthalic anhydride and alumina is placed into the hopper and fluidized by a stream of ammonia admitted to the mouth of the tube. The coils are heated to a temperature of 275° C. and the rate of feed is such that about 20 moles of ammonia are provided for each mole of anhydride. Ortho-phthalodinitrile is obtained in a yield of about 86%.

Various changes and modifications may be made without departing from the spirit and scope of the present invention and it is intended that such obvious changes and modifications be considered within the purview of the annexed claims.

What is claimed is:

1. In the conversion into the corresponding nitriles of normally solid aromatic carboxylic acids, aromatic carboxylic acid anhydrides, aromatic carboxylic acid amides, aromatic carboxylic acid imides and mixtures thereof by reaction with ammonia in the presence of a dehydrating catalyst, the improvement which comprises forming an intimate mixture of the catalyst and the solid reactant, and heating said mixture in the presence of gaseous ammonia, whereby the solid reactant immediately upon vaporization is reacted with the ammonia.

2. In the conversion into the corresponding nitriles of normally solid aromatic carboxylic acids, aromatic carboxylic acid anhydrides, aromatic carboxylic acid amides, aromatic carboxylic acid imides and mixtures thereof by reaction with ammonia in the presence of a dehydrating catalyst, the improvement which comprises forming an intimate mixture of the solid reactant and catalyst, preheating said mixture and then contacting said mixture with gaseous ammonia in a zone maintained at reaction temperature, whereby the solid reactant is vaporized and immediately reacts with the ammonia.

3. In the conversion into the corresponding nitriles of normally solid aromatic carboxylic acids, aromatic carboxylic acid anhydrides, aromatic carboxylic acid amides, aromatic carboxylic acid imides and mixtures thereof by reaction with ammonia in the presence of a dehydrating catalyst, the improvement which comprises forming an intimate mixture of the solid reactant and catalyst, fluidizing said mixture in gaseous ammonia, and introducing said fluidized mixture into a reaction zone maintained at reaction temperatures, whereby the solid reactant is vaporized and immediately reacts with the ammonia.

4. The process of claim 1, wherein said solid reactant is benzoic acid.

5. The process of claim 1, wherein said solid reactant is a phthalic acid.

6. The process of claim 1, wherein said solid reactant is isophthalic acid.

7. The process of claim 1, wherein said solid reactant is terephthalic acid.

8. The process of claim 1, wherein said solid reactant is orthophthalic acid anhydride.

9. The process of claim 1, wherein said solid reactant is phthalimide.

10. In the conversion into the corresponding nitriles of normally solid aromatic carboxylic acids, aromatic carboxylic acid anhydrides, aromatic carboxylic acid amides, aromatic carboxylic acid imides and mixtures thereof by reaction with gaseous ammonia in the presence of a dehydrating catalyst, the improvement which comprises filling a reaction zone with an intimate mixture of the catalyst and the solid reactant, continuously passing gaseous ammonia into said zone while maintaining said zone at reaction temperature, continuously withdrawing gaseous ammonia and nitrile from said zone, continuously withdrawing solid catalyst from said zone, and continuously feeding an intimate mixture of catalyst and solid reactant to said zone, the rate of catalyst feed being equal to its rate of withdrawal.

11. The process of claim 10, wherein said solid reactant is an aromatic acid.

References Cited in the file of this patent

UNITED STATES PATENTS

| | | |
|---|---|---|
| 2,054,088 | Linstead et al. | Sept. 15, 1936 |
| 2,678,941 | Ferstandig | May 18, 1954 |
| 2,770,641 | McKeever et al. | Nov. 13, 1956 |
| 2,773,891 | Toland et al. | Dec. 11, 1956 |